(12) United States Patent
Boeck

(10) Patent No.: US 9,982,547 B2
(45) Date of Patent: May 29, 2018

(54) GUIDE MECHANISM FOR A GAS TURBINE AND GAS TURBINE HAVING SUCH A GUIDE MECHANISM

(71) Applicant: MTU Aero Engines AG, Munich (DE)

(72) Inventor: Alexander Boeck, Kottgeisering (DE)

(73) Assignee: MTU AERO ENGINES AG, Munich (DE)

(*) Notice: Subject to any disclaimer, the term of this patent is extended or adjusted under 35 U.S.C. 154(b) by 290 days.

(21) Appl. No.: 14/747,026

(22) Filed: Jun. 23, 2015

(65) Prior Publication Data

US 2015/0377042 A1 Dec. 31, 2015

(30) Foreign Application Priority Data

Jun. 26, 2014 (DE) .......................... 10 2014 212 310

(51) Int. Cl.

| F01D 9/02 | (2006.01) |
|---|---|
| F04D 29/64 | (2006.01) |
| F01D 11/00 | (2006.01) |
| F01D 25/28 | (2006.01) |
| F01D 17/16 | (2006.01) |
| F04D 29/56 | (2006.01) |
| F01D 9/04 | (2006.01) |

(52) U.S. Cl.
CPC ................ *F01D 9/02* (2013.01); *F01D 9/04* (2013.01); *F01D 11/005* (2013.01); *F01D 17/162* (2013.01); *F01D 25/28* (2013.01); *F04D 29/563* (2013.01); *F04D 29/644* (2013.01); *F05D 2220/32* (2013.01); *F05D 2230/60* (2013.01); *F05D 2240/12* (2013.01); *Y02T 50/671* (2013.01); *Y10T 29/49323* (2015.01)

(58) Field of Classification Search
CPC ...... F01D 17/162; F01D 25/28; F01D 25/246; F01D 9/042; F01D 5/143; F04D 29/563; F04D 29/644; Y10T 29/4923; F05D 2240/12; F05D 2230/60
See application file for complete search history.

(56) References Cited

U.S. PATENT DOCUMENTS

| 3,558,237 A | 1/1971 | Wall, Jr. |
| 3,736,070 A * | 5/1973 | Moskowitz ............ F01D 17/16 415/147 |

(Continued)

FOREIGN PATENT DOCUMENTS

| DE | 102008032661 A1 | 1/2010 |
| EP | 0757161 A2 | 2/1997 |

(Continued)

*Primary Examiner* — Dwayne J White
*Assistant Examiner* — Topaz L Elliott
(74) *Attorney, Agent, or Firm* — Barlow, Josephs & Holmes, Ltd.

(57) ABSTRACT

A guide mechanism for a gas turbine has a casing supporting on its interior a duct delimited by radially inner and outer duct segments. A variable guide vane located at least partially within the duct can rotate about an axis of rotation to guide flow of a fluid in the duct. The radially inner duct segment is fastened to the guide vane and is retained on the casing element via the guide vane, which is mounted on the casing element via a bushing inserted in the radial direction from outside to inside into a passage opening of the casing element.

25 Claims, 2 Drawing Sheets

(56) References Cited

U.S. PATENT DOCUMENTS

| | | | | |
|---|---|---|---|---|
| 3,990,810 | A * | 11/1976 | Amos | F01D 17/162 |
| | | | | 415/161 |
| 4,135,362 | A * | 1/1979 | Glenn | F01D 17/162 |
| | | | | 415/115 |
| 4,834,613 | A | 5/1989 | Hansen et al. | |
| 4,861,228 | A * | 8/1989 | Todman | F01D 17/162 |
| | | | | 415/115 |
| 5,000,659 | A * | 3/1991 | Catte | F01D 17/162 |
| | | | | 403/337 |
| 6,524,065 | B2 * | 2/2003 | Briesenick | F01D 11/00 |
| | | | | 415/173.7 |
| 2008/0031730 | A1 | 2/2008 | Houradou et al. | |
| 2012/0093632 | A1 | 4/2012 | Crespo et al. | |
| 2014/0255177 | A1 * | 9/2014 | Cadieux | F01D 9/042 |
| | | | | 415/208.1 |
| 2016/0032760 | A1 * | 2/2016 | Boeck | F01D 9/041 |
| | | | | 415/1 |

FOREIGN PATENT DOCUMENTS

| | | | | |
|---|---|---|---|---|
| EP | 1927670 A1 * | 6/2008 | | C23C 28/00 |
| EP | 2554794 A2 | 2/2013 | | |
| GB | 2016091 A | 9/1979 | | |
| GB | 2210935 A | 6/1989 | | |
| WO | 2005047656 A1 | 5/2005 | | |

* cited by examiner

GUIDE MECHANISM FOR A GAS TURBINE AND GAS TURBINE HAVING SUCH A GUIDE MECHANISM

BACKGROUND OF THE INVENTION

The work that led to this invention was funded under Grant Agreement No. CSJU-GAM-SAGE-2008-001 as part of the European Union's Seventh Framework Program (FP7/2007-2013) for the Clean Sky Joint Technology Initiative.

The invention relates to a guide means for a gas turbine, in particular for an aircraft engine and to a gas turbine, in particular an aircraft engine having such a guide means.

Such a guide means for a gas turbine is taken as being known from EP 2 554 794 A2. The guide means comprises at least one casing element as well as at least one first duct segment, which is arranged in the radial direction on the inside of the casing element. At least one duct, through which a gas can flow, is delimited at least partially outward in the radial direction by the first duct segment. The known guide means further comprises at least one second duct segment, which is arranged in the radial direction on the inside of the first duct segment and the duct is delimited at least partially inward in the radial direction by the second duct segment. Moreover, the guide means comprises at least one guide vane, which is arranged at least partially in the duct and which can rotate around an axis of rotation relative to the casing element and relative to the duct segments. The duct is designed as an annular duct or annular space, for example, and serves to guide the gas, which can have a high temperature and accordingly can be a so-called hot gas. The guide vane serves to divert or redirect the gas flowing through the duct and can rotate around the axis of rotation between at least two positions that differ from one another. If, for example, a plurality of guide vanes are provided, which can move and, in particular, can rotate relative to the casing element and to the duct segments and are arranged in succession in the circumferential direction, it is thereby possible to create a variable guide vane system or cascade of the gas turbine. The guide vanes and thus the gas turbine as a whole can be adapted as needed at different operating points by rotating the guide vanes, so that it is possible to realize an efficient operation of the gas turbine.

WO 2005/047656 A1 discloses a guide vane cascade for a turbomachine, in particular for a gas turbine, which has a plurality of fixed guide vanes positioned in an annular space or in a main flow duct. The guide vanes are designed so as to each be adjustable round a respective pivot axis, with the radial internal ends thereof bordering a first limiting surface of the annular space and the radial external ends thereof bordering a second limiting surface of the annular space. In this case, it is provided that the first limiting surface of the annular space and/or the second limiting surface of the annular space is embodied in such a manner that, in each pivotable position of the guide vanes, gaps are minimized between the radial internal ends of the guide vanes and the first limiting surface of the annular space and/or gaps are minimized between the radial external ends of the guide vanes and the second limiting surface of the annular space.

Furthermore, EP 0 757 161 A2 discloses a mounting assembly of a guide vane on a casing of a compressor for a gas turbine, wherein the guide vane is mounted on the casing via a bushing. In this case, the bushing is accommodated at least partially in a bore of the casing.

BRIEF SUMMARY OF THE INVENTION

The object of the present invention is to create a guide means of the kind mentioned in the introduction and a gas turbine, in particular an aircraft engine having such a guide means, by means of which it is possible to realize an especially simple assembly of the guide means as well as an especially efficient operation of the gas turbine.

This object is achieved by a guide means and by a gas turbine of the present invention. Advantageous embodiments with appropriate enhancements of the invention are presented and discussed in detail below.

Such a guide means for a gas turbine, in particular for an aircraft engine, comprises at least one casing element, at least one first duct segment, which is arranged in the radial direction on the inside of the casing element, and at least one second duct segment, which is arranged in the radial direction on the inside of the first duct segment. At least one duct, through which a gas can flow, is delimited at least partially outward in the radial direction by the first duct segment. The duct is delimited at least partially inward in the radial direction by the second duct segment. Moreover, the guide means comprises at least one guide vane, which is arranged at least partially in the duct and which can rotate around an axis of rotation relative to the casing element and relative to the duct segments.

In order to be able to realize an especially simple assembly of the guide means as well as an especially efficient operation of the gas turbine as a whole, it is provided in accordance with the invention that the second duct segment is fastened to the guide vane and is retained on the casing element via the guide vane. The guide vane is mounted on the casing element via a bushing, which is inserted in the radial direction from the outside to the inside into a passage opening of the casing element.

The invention is based on the realization that, in conventional guide means, large gaps of the guide vane with respect to the duct, which is designed as an annular space or annular duct, for example, that is, between the guide vane and the duct segments, are provided. These large gaps are usually provided on account of high temperature differences and the high thermal expansions that thereby ensue, so as to ensure that the guide vane can move and thus can be adjusted the relative to the casing element and the duct segments in spite of these thermal expansions. However, these large gaps, which are usually provided, are detrimental to an efficient operation of the gas turbine, because the gaps result in a loss of efficiency.

In the guide means according to the invention, however, it is now possible to employ a guide vane that moves relative to the duct segments and thus to be able to adapt the gas turbine, in particular an aircraft engine, efficiently to different operating points and, at the same time, to create especially small and at least essentially temperature-independent gaps of the guide vane with respect to the duct, that is, between the guide vane and the duct segments. The design of the guide means according to the invention makes it possible namely to compensate for the thermal expansions, which occur in principle, by bending of the guide vane in the circumferential direction. As a result, undesired flows can be prevented or at least minimized, so that at least the predominant part of the gas flowing through the duct can be effectively and efficiently diverted or redirected by means of the guide vane in a desired manner. Moreover, it is possible to achieve an especially good sealing effect, in particular in the radially outer region of the duct, so that undesired flows, which are detrimental to the efficiency of the gas turbine, can be at least minimized.

In addition, the design of the guide means according to the invention enables a particularly simple assembly, so that the guide means and the gas turbine on the whole can be produced in a manner that is especially simple as well as time-efficient and cost-effective. This is possible, in particular, because the bushing can be inserted into the passage opening of the casing element in the radial direction from the outside to the inside and thus can be mounted. Furthermore, it is preferably provided that, in terms of its dimensions, in particular in terms of its extension in the radial direction of the gas turbine and/or in terms of its wall thickness, the bushing is designed in such a way that, when the bushing is dismantled, a predetermined range of movement in which the guide vane and the duct segments can move is afforded, thereby enabling assembly of the duct segments and the guide vane. In other words, the bushing is designed in such a way that, for example, when it is absent, a sufficient clearance is available for assembly of the guide vane and the duct segments. For example, once the duct segments and the guide vane have been arranged and moved into a predeterminable, desired mounting position, the bushing can be inserted in the radial direction from outside to inside into the passage opening, as a result of which the guide vane and, via the latter, for example, the duct segments can be fixed in place in the predeterminable mounting position on the casing element by means of the bushing. For example, it is possible, in the course of assembly of the guide vane and the duct segments, to pull the guide vane outward at least a little bit out of the passage opening and thus out of the casing element in the radial direction. This is accompanied by a movement of at least the outer first duct segment outward in the radial direction, so that it is possible, for example, to realize an especially simple mounting of the inner second duct segment in the casing element.

For realizing an especially simple assembly, it is provided in an embodiment that the first duct segment has at least one passage opening, via which the first duct segment is mounted axially and in the circumferential direction relative to the casing element.

In another embodiment, the first duct segment has at least two grooves, which are spaced apart in the axial direction and via which the first duct segment is mounted relative to the casing element. As a result, the first duct segment can be retained or mounted on the casing element in a manner that is especially simple as well as time-efficient and cost-effective.

Another embodiment is characterized in that the bushing has a wall thickness that is greater than the length of at least one of the tabs of the first duct segment projecting into one of the grooves. At least one tab can thereby be inserted simply into the corresponding groove.

In an advantageous embodiment of the invention, the bushing projects inward in the radial direction over at least one wall region of the casing element that borders the bushing. As a result, it is possible to realize an especially stable mounting of the guide vane on the casing element via the bushing. Moreover, it is possible in this way to realize an especially great range of movement that is afforded when the bushing has been dismantled and is available for assembly of the guide vane and duct segments.

In order to realize an especially simple assembly of the guide means, it is provided in another embodiment of the invention that the guide vane has at least one connecting element, in particular a trunnion, that is accommodated at least partially in a corresponding uptake opening of the second duct segment and by means of this element, the guide vane is connected to the second duct segment, with the length of the bushing that projects over the wall region bordering the bushing being greater than the length of the connecting element that projects into the uptake opening.

Finally, it has proven advantageous for realizing an especially simple assembly if a clearance is provided radially between the first duct segment and the casing element, said clearance being greater at least in the radial direction than the length of the connecting element that projects into the uptake opening.

Another embodiment is characterized in that the guide vane is mounted on the bushing via a bearing element that is provided on the guide vane and is accommodated at least partially in the bushing and at least partially in the passage opening of the casing element. The bearing element is designed as a pin or trunnion, for example, and has an outer contour that corresponds at least essentially to the form of a straight circular cylinder. As a result, it is possible to realize an especially simple assembly and an especially simple mounting of the guide vane on the bushing. Preferably, it is provided in this case that, when the bushing has been dismantled, the range of movement is afforded when the bearing element is accommodated at least partially in the passage opening. This means that, when the bushing has been dismantled, the bearing element is accommodated at least partially in the passage opening, with sufficient clearance, in which the guide vane and the duct segments can move, being available for the assembly.

In an especially advantageous embodiment of the invention, at least one sealing element, in particular a ring seal, is retained on the second duct segment on a side of the second duct segment that faces inward in the radial direction. The inner second duct segment thus has a dual function. On the one hand, the second duct segment serves to delimit the duct. On the other hand, the inner second duct segment serves to retain the ring seal. As a result, it is possible to dispense with additional and separate fastening elements, so that an especially simple assembly, a small number of parts, and a low weight of the guide means can be realized. By means of the ring seal, for example, it is possible to seal the second duct segment against a rotor element, in particular a rotor disc, of a rotor of the gas turbine that can rotate around an axis of rotation relative to the casing element, with the axis of rotation of the rotor being directed in the axial direction of the gas turbine.

The guide vane also takes on a dual function, because, on the one hand, it serves to divert the gas flowing through the duct and, on the other hand, it serves to fasten or retain the inner second duct segment. Additional or separate retaining elements for retaining and fastening the inner second duct segment can thus be dispensed with, so that an especially small number of parts and an especially simple as well as time-efficient and cost-effective assembly of the guide means can be realized.

For realization of an especially advantageous sealing effect, it is provided in another embodiment of the invention that the sealing element is retained on a second duct segment via a spoke centering. In this way, it is possible to realize an especially precise positioning of the sealing element, so that an especially good sealing effect can be created. The sealing effect of the sealing element against the rotor disc is not impaired by the spoke centering of the sealing element, in particular of the ring seal. This concept enables an especially high efficiency of the gas turbine to be achieved. Preferably, the ring seal is designed to run completely around in the circumferential direction; that is, it is designed as a closed ring.

It has been found to be particularly advantageous when the casing element is designed to be undivided at least in its circumferential direction. In other words, the casing element is designed as one piece or one part at least in its circumferential direction. In this way, the number of parts and the effort of assembling the gas turbine as a whole are especially minimized. At the same time, the guide vanes and the duct segments can be mounted especially simply in the casing element designed as an undivided casing. The casing element is designed, for example, as a ring element that is closed in the circumferential direction and thus has a one-part design in the circumferential direction.

In contrast to this, a segmented construction of the duct is preferably provided. This means that, for example, a plurality of successive first duct segments are provided in the circumferential direction, with the first duct segments each partially delimiting the duct outward in the radial direction. Alternatively or additionally, a plurality of second duct segments, which are arranged in succession in the circumferential direction, are provided, by means of which the duct is delimited inward in the radial direction. As a result of this segmented construction, the duct segments, which are connected to one another in a sealed manner via grooves and sealing elements, in particular metal sealing plates, for example, the duct segments can make temperature-induced movements relative to one another and thus breathe freely, that is, decrease or increase their diameter without certain limits. In this way, excessive thermal expansions of the guide vanes with respect to the duct can be prevented. The position of the movable guide vane is fixed via the bushing on the casing element, so that, for example, the temperature-induced movements of the duct segments relative to one another are not overly detrimental to the desired position of the bushing. Excessive thermal stresses between the individual duct segments can be prevented by this segmented construction.

Another embodiment is characterized in that the casing element, the guide vanes, and the duct segments are designed as components that are constructed separate from one another and connected to one another at least indirectly. In this way, it is possible to prevent excessive thermal stresses between the guide vane, the casing element, and the duct segments, because the components can move relative to one another.

Another aspect of the invention relates to a gas turbine, in particular an aircraft engine, having at least one guide means described above. Advantageous embodiments of the guide means according to the invention are to be regarded as advantageous embodiments of the gas turbine according to the invention and vice versa.

BRIEF DESCRIPTION OF THE DRAWINGS

Further advantages, features, and details of the invention ensue from the following description of a preferred exemplary embodiment as well as on the basis of the drawings. The features and combinations of features mentioned above in the description as well as the following features and combinations of features mentioned in the description of the figures and/or shown solely in the figures can be used not only in the respectively presented combinations, but also in other combinations or individually, without departing from the scope of the invention.

Shown are.

DETAILED DESCRIPTION OF THE INVENTION

In the figures, identical or functionally identical elements are provided with identical reference numbers.

Figure 1:
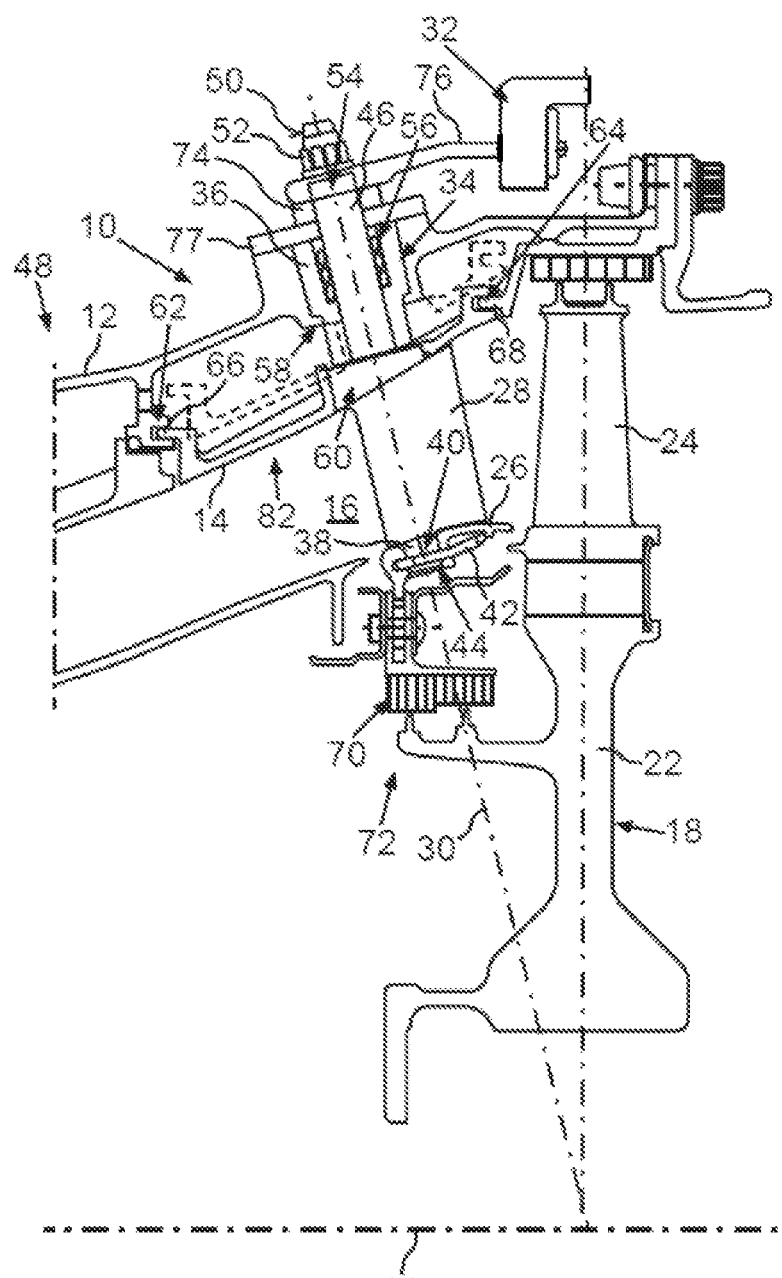
FIG. 1 a schematic longitudinal sectional view, excerpted, of a guide means for a gas turbine having at least one casing element, at least one first duct segment, at least one second duct segment, and at least one guide vane, which is mounted on the casing element via a bushing, with the second duct segment being fastened to the guide vane and being retained on the casing element via said guide vane.

FIG. 1 shows a guide means, identified as a whole by reference 10, for a gas turbine. The guide means 10 comprises at least one casing element 12, which is designed in one part, that is, in one piece, in the circumferential direction of the gas turbine, for example, and thus of the casing element 12. In this case, the casing element 12 is designed, for example, as a ring that runs completely around in the circumferential direction, that is, a closed ring. Moreover, the guide means 10 comprises a plurality of first duct segments, which are arranged on the inner side of the casing element 12 in the radial direction of the casing element 12 or of the gas turbine, one of which, a duct segment identified by reference 14, can be seen in FIG. 1. The plurality of first duct segments are arranged in succession in the circumferential direction. The following statements regarding the first duct segment 14 can be applied also to the other first duct segments in a straightforward manner.

It can be seen from FIG. 1 that the outer first duct segment 14 is spaced apart from the casing element 12 at least partially and at least predominantly inward in the radial direction. Moreover, at least one duct 16, through which a gas can flow, is delimited at least partially outward in the radial direction by the outer first duct segment 14. The gas has a high temperature and is thus a hot gas and is conveyed via the duct 16 to at least one rotor 18 of the gas turbine. The rotor 18 can rotate relative to the casing element 12 around an axis of rotation 20 and comprises a rotor disc 22 and a plurality of rotor blades, one rotor blade of which, identified by reference 24, can be seen in FIG. 1. In this case, the axis of rotation 20 extends in the axial direction of the gas turbine and thus of the casing element 12.

Moreover, the guide means 10 comprises at least one second duct segment 26, which is arranged on the inner side of the first duct segment 14 in the radial direction. The inner second duct segment 26 can be designed to run completely around in the circumferential direction, that is, as a closed ring. Alternatively to this, there is provided a plurality of inner second duct segments, which are arranged in succession in the circumferential direction. In this case, the duct segment 26 is one of a plurality of second duct segments. Thus, the following statements regarding the second duct segment 26 can also be applied in a straightforward manner to the other second duct segments that, if need be, have been provided.

The duct 16 is delimited inward in the radial direction at least partially by the second duct segment 26. This means that a segmented construction of the duct 16 is provided, because it is delimited outward in the radial direction by the plurality of first duct segments and inward in the radial direction by the second duct segments. Moreover, the guide means 10 comprises a plurality of guide vanes, which are arranged in succession in the circumferential direction. One guide vane, identified by reference 28, of this plurality of guide vanes can be seen in FIG. 1. The following statements regarding the guide vane 28 can be applied to the other guide vanes in a straightforward manner. The guide vane 28 is arranged at least partially in the duct 16 and can rotate relative to the casing element 12 as well as relative to the duct segments 14, 26 around an axis of rotation 30. It can be seen from FIG. 1 that the axis of rotation 30 is inclined with respect to the axis of rotation 20 of the rotor 18.

A variable turbine guide vane system or cascade, by means of which the gas flowing through the duct 16 can be diverted as needed, is created by the plurality of guide vanes. The turbine guide vane cascade, that is, the guide vane 28, is arranged upstream of the rotor blade 24 in the direction of flow of gas through the duct, so that the gas flowing through the duct 16 can be diverted or redirected upstream of the rotor blade 24 by means of the guide vane 28. As a result, the gas that is diverted by means of the guide vane 28 can flow against the rotor blade 24 at a flow angle, by means of which it is possible to realize an especially efficient and efficiency-promoting operation of the gas turbine. The flow angle can be varied by rotating the guide vane 28 around the axis of rotation 30, so that, in this way, the turbine guide vane cascade and thus the gas turbine as a whole can be adapted as needed to different operating points.

For this purpose, the guide vane 28 is coupled via a coupling device 32 to at least one actuator, by means of which the guide vane 28 can be rotated via the coupling device 32 relative to the casing element 12 around the axis of rotation 30. As a result, the guide vane 28 can be adjusted, for example, between at least two positions that differ from one another. The duct 16 is designed as an annular duct or annular space, for example, so that the duct segments 14, 26 are also referred to as annular space segments. In this case, the individual annular space segments, that is, for example, the plurality of first duct segments and/or the plurality of second duct segments are connected to one another in a sealed manner via grooves and sealing elements, in particular in the form of metal sealing plates. Thermal expansions at the respective guide vanes with respect to the annular space can be prevented or at least minimized by the segmentation of the duct 16.

In order to realize an especially simple assembly of the guide means 10 and of the gas turbine as a whole as well as a particularly efficient operation of the gas turbine, the second duct segment 26 is fastened to the guide vane 28 and to the casing element 12 via the guide vane 28. In this case, the guide vane is mounted on the casing element 12 via a bushing 36, which is inserted in the radial direction from outside to inside into a passage opening 34 in the casing element 12.

It can be seen from FIG. 1 that the guide vane 28 has a connecting element in the form of a trunnion 38, which is accommodated at least partially in a corresponding uptake opening 40 of the second duct segment 26 that, in the present case, is designed as a passage opening. The guide vane 28 is connected via the trunnion 38 by means of at least one fastening element in the form of a pin 42 to the second duct segment 26, with the pin 42 having predominantly a U-shaped design. This means that the second duct segment 26 is fastened by means of the U-shaped pin 42 to the guide vane 28 via its trunnion 38. As can be seen by looking at FIGS. 2 and 3 together, the pin 42 is inserted into corresponding uptake openings of the second duct segment 26, which are spaced apart in the circumferential direction of the casing element 12, and engages in a completely circumferential groove 44 of the trunnion 38. In this way, the pin 42 acts in a form-fitting manner together with both the second duct segment 26 and with the guide vane 28, so that the second duct segment 26 is retained at least in a form-fitting manner and at least radially on the guide vane 28 via the pin 42.

The guide vane 28 further has a bearing element in the form of a trunnion 46. The trunnion 46 is a rod element and has an outer contour with a form that corresponds at least essentially to a form of straight circular cylinder. The trunnion 46 is accommodated at least partially in the bushing 36. Furthermore, the trunnion 46 is accommodated at least partially in the passage opening 34 of the casing element 12. It can be seen from FIG. 1 that the trunnion 46 passes through both the bushing 36 and the passage opening 34 and thus projects on an outer side 48 of the casing element 12 outward in the radial direction.

In a subregion arranged on the outside of the casing element 12, that is, on the outer side 48, the trunnion 46 has an outer thread 50, onto which a nut 52 is screwed. The guide vane 28 is secured in the radial direction and is connected to the coupling device 32 by means of the nut 52. In another subregion 54, the trunnion 46 has an outer contour that is not round—for example, a polygonal, in particular quadrangular, outer contour—by means of which the trunnion 46 is connected in a rotationally rigid manner to the coupling device 32. As a result, torques can be transmitted between the trunnion 46 and the coupling device 32, so that, in this way, the guide vane 28 can be rotated. Moreover, a sealing element in the form of a packing gland 56 is provided, which is arranged in the radial direction of the bushing 36 between it and the trunnion 46.

The bushing 36 projects inward in the radial direction over at least one wall region 58 of the casing element 12 bordering the bushing. In this case, it is preferably provided that the bushing 36 of the casing element 12, which can be mounted from the outside in the radial direction, projects so far inward in the radial direction and has such a thick wall thickness that, when the bushing 36 is dismantled, there is sufficient clearance for assembly of the duct segments 14, 26 and of the guide vane 28. An assembly position of the first duct segment 14, which the first duct segment 14 can assume when the bushing 36 has been dismantled, is illustrated in FIG. 1 by a dashed line. This means that the first duct segment 14 is moved into the assembly position when the guide vane 28 is mounted.

The first duct segment 14 has a passage opening 60, through which the guide vane 28 passes. In this way, the duct segment 14 can be fixed in position in the axial direction and in the circumferential direction relative to the casing element 12 via the guide vane 28 and the bushing 36. Moreover, the first duct segment 14 is fixed in position radially via at least one front groove 62 and via a least one rear groove 64 on the casing element 12. In this case, the front groove 62 is provided on the casing element 12, with a tab 66 of the first duct segment 14 engaging at least partially in the front groove 62. The rear groove 64 is provided on the first duct segment 14, with a tab 68, provided on the casing element 12, engaging in the rear groove 64.

Moreover, the guide means 10 comprises a sealing element in the form of a ring seal 70, which is fastened to the second duct segment 26 on a side 72 of the second duct segment 26 that faces inward in the radial direction. This means that, for example, the ring seal 70, which runs completely around in the circumferential direction of the casing element 12, that is, the closed ring seal, is fastened to the respective second duct segments, so that no additional fastening elements are provided or are required for retaining and fastening the ring seal 70. The second duct segment 26 is sealed against the rotor disc 22 by means of the ring seal 70.

Overall, it can be seen that the casing element 12, the guide vane 28, and the duct segments 14, 26 are designed as components that are produced separately from one another and are connected at least indirectly to one another, with the guide vane 28 and the duct segment 14, 26 forming, together with the ring seal 70, a combined component, which is retained on the casing element 12 via the guide vane 28 and the bushing 36 and is suspended from it. In FIG. 1, moreover, an adjusting disc or a shim 74 is provided, which is arranged between a lever arm 76 of the coupling device 32 and a cover 77.

For realization of an advantageous retaining and centering of the ring seal 70, it is provided that the ring seal 70 is retained on the second duct segment 26 via a spoke centering. In this case, a groove 78 for the spoke centering of the ring seal 70 can be seen, which is provided on the second duct segment 26 in FIG. 2. Furthermore, in FIG. 2, two of the first duct segments can be seen, which are arranged in succession in the circumferential direction of the casing element 12. Provided at the respective first duct segment 14 is an annular space contouring piece 80, which is arranged on a side 82 of the respective duct segment 14 that faces inward in the radial direction and borders the duct 16. A gap between the guide vane 28 and the respective first duct segment 14 can be kept at least essentially constant in different positions of the guide vane 28 by means of the annular space contouring piece 80.

Preferably, a narrow and, in particular, sealing fit is provided between the guide vane 28 and the first duct segment 14 and/or between the guide vane 28 and the second duct segment 26, which, although it permits a rotation of the guide vane 28 relative to the duct segments 14, 26, otherwise fixes in position the respective duct segment 14 and/or 26 in the axial direction and in the circumferential direction.

The duct segment 14, designed as an annular space segment, is retained in a rotationally fixed manner on the casing element 12, whereby it is fixed in position also in the radial direction of the casing element 12 and can thus breathe together with the casing element 12 during thermal expansion; that is, it can move. In comparison to a one-piece construction of the casing element 12 with the duct segments 14, 26, the design of the casing element 12 and of the duct segments 14, 26 as separate components has the advantage that excessive thermal stresses can be prevented.

In this case, the first duct segment 14, as shown in the embodiment depicted in the figures, is preferably fixed in position in the axial direction and in the circumferential direction essentially via the guide vane 28 and the bushing 36 relative to the casing element 12, whereas a local fixation of the first duct segment 14 in the radial direction relative to the casing element 12 occurs essentially by way of the two grooves 62, 64. Through this kind of fastening of the first duct segment 14 to the casing element 12 and through the spoke-centered suspension of the ring seal 70 on the second duct segment 26, an essentially stress-free and low-gap operation of the guide means 10 is made possible. In this way, the component sections of the guide means 10 that come into direct contact with the hot gas in the duct 16, namely, the guide vane 28, the first duct segment 14, and the second duct segment 26, can expand, without introducing stresses into the casing element 12 and/or the ring seal 70.

As already described above, the first duct segment 14 and the second duct segment 26 preferably do not form a closed ring in the circumferential direction in this case, but rather only form circular ring segments. This enables the segments to breathe together with the casing element 12 during thermal expansion. In this case, metal sealing plates, which are not depicted in the figures, can be provided in the circumferential direction between mutually adjacent first duct segments 14 and/or between mutually adjacent second duct segments 26 and ensure a sealing of the duct 16 in the radial direction during breathing.

Figure 2:
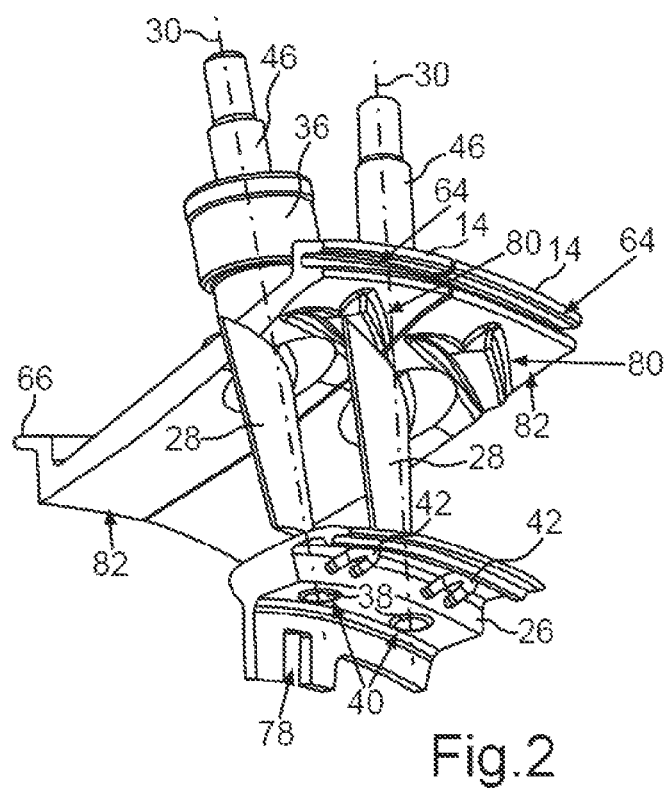
FIG. 2 a schematic perspective view of the guide means.
Figure 3:
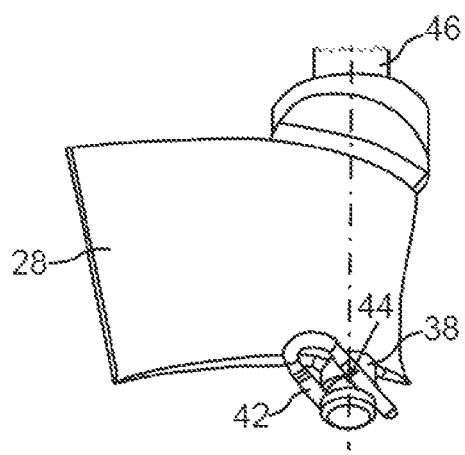
FIG. 3 another schematic perspective view of the guide means.

In addition, it is noted that—as illustrated in FIG. 2—a respective first duct segment 14 can be assigned to one or a plurality of respective guide vanes 28 and a second duct segment 26 can be assigned to a plurality of guide vanes—in the illustrated exemplary embodiment, two guide vanes.

The invention claimed is:

1. A guide mechanism for a gas turbine, comprising:
at least one casing element, the casing element having a passage opening therethrough;
at least one first duct segment arranged in the radial direction on the inside of the casing element, the first duct segment defining a portion of at least one duct through which gas can flow, at least partially delimited outward in the radial direction;
at least one second duct segment arranged in the radial direction on the inside of the first duct segment, the second duct segment defining a portion of the duct, at least partially delimited inward in the radial direction;
the at least one casing element including an unbroken annular cross-section that circumscribes the duct;
at least one guide vane arranged at least partially in the duct, the guide vane configured and arranged to rotate around an axis of rotation relative to the at least one casing element and relative to the duct segments; and
at least one bushing inserted in the radial direction from the outside to the inside into the passage opening of the casing element, the bushing projecting radially inward from the casing element;
wherein the guide vane is mounted on the casing element via the bushing;
wherein the second duct segment is fastened to the guide vane and is retained on the at least one casing element via the guide vane.

2. The guide mechanism according to claim 1, wherein the first duct segment has at least one passage opening, via which the first duct segment is mounted axially and in the circumferential direction relative to the casing element.

3. The guide mechanism according to claim 1, wherein the first duct segment is mounted relative to the at least one casing element via at least two tabs and at least two grooves, which are spaced apart in the axial direction.

4. The guide mechanism according to claim 3, wherein the bushing has a wall thickness that is greater than the length of at least one of the tabs of the first duct segment projecting into one of the grooves.

5. The guide mechanism according to claim 3, wherein the bushing has a wall thickness that is greater than the length of at least one of the tabs of the first duct segment projecting into one of the grooves such that removal of the bushing allows sufficient mobility to move the tabs from an uninstalled state to an installed state within the grooves.

6. The guide mechanism according to claim 1, wherein the bushing projects inward in the radial direction over at least one wall region of the at least one casing element bordering the bushing.

7. The guide mechanism according to claim 6, wherein the guide vane has at least one connecting element which is accommodated at least partially in a corresponding uptake opening of the second duct segment, and the guide vane is connected to the second duct segment by means of the at least one connecting element, wherein the length of the bushing that projects over the wall region bordering the bushing is greater than the length of the at least one connecting element projecting into the uptake opening.

8. The guide mechanism according to claim 7, wherein a clearance is provided radially between the first duct segment and the at least one casing element, which is greater at least in the radial direction than the length of the at least one connecting element projecting into the uptake opening.

9. The guide mechanism according to claim 1, wherein the guide vane is mounted via a bearing element, which is provided on the guide vane and is accommodated at least partially in the bushing and at least partially in the passage opening of the at least one casing element, on the bushing.

10. The guide mechanism according to claim 1, wherein at least one sealing element, is retained on the second duct segment on a side of the second duct segment that faces inward in the radial direction.

11. The guide mechanism according to claim 10, wherein the sealing element is retained on the second duct segment via a spoke centering.

12. The guide mechanism according to claim 1, wherein the at least one casing element, the guide vane, and the duct segments are designed as components that are separately constructed and are connected at least indirectly to one another.

13. The guide mechanism according to claim 1, wherein the guide means is configured and arranged for use in a gas turbine.

14. The guide mechanism according to claim 1, wherein the bushing has a wall thickness that is greater than the length of at least one of the tabs of the first duct segment projecting into one of the grooves such that removal of the bushing allows sufficient mobility to move the tabs from an uninstalled state to an installed state within the grooves.

15. A guide mechanism for a gas turbine, comprising:
at least one casing element, the casing element having a passage opening therethrough;
at least one first duct segment arranged in the radial direction on the inside of the casing element, the first duct segment defining a portion of at least one duct through which gas can flow, at least partially delimited outward in the radial direction; the at least one first duct segment is mounted relative to the at least one casing element via at least two tabs and at least two grooves, which are spaced apart in the axial direction;
at least one second duct segment arranged in the radial direction on the inside of the first duct segment, the second duct segment defining a portion of the duct, at least partially delimited inward in the radial direction;
at least one guide vane arranged at least partially in the duct, the guide vane configured and arranged to rotate around an axis of rotation relative to the at least one casing element and relative to the duct segments; and
at least one bushing inserted in the radial direction from the outside to the inside into the passage opening of the casing element, the bushing projecting radially inward from the casing element; the bushing has a wall thickness that is greater than the length of at least one of the tabs of the first duct segment projecting into one of the grooves;
wherein the guide vane is mounted on the casing element via the bushing;
wherein the second duct segment is fastened to the guide vane and is retained on the at least one casing element via the guide vane.

16. The guide mechanism according to claim 15, wherein the first duct segment has at least one passage opening, via which the first duct segment is mounted axially and in the circumferential direction relative to the casing element.

17. The guide mechanism according to claim 15, wherein the bushing projects inward in the radial direction over at least one wall region of the at least one casing element bordering the bushing.

18. The guide mechanism according to claim 17, wherein the guide vane has at least one connecting element which is accommodated at least partially in a corresponding uptake opening of the second duct segment, and the guide vane is connected to the second duct segment by means of the at least one connecting element, wherein the length of the bushing that projects over the wall region bordering the bushing is greater than the length of the at least one connecting element projecting into the uptake opening.

19. The guide mechanism according to claim 18, wherein a clearance is provided radially between the first duct segment and the at least one casing element, which is greater at least in the radial direction than the length of the at least one connecting element projecting into the uptake opening.

20. The guide mechanism according to claim 15, wherein the guide vane is mounted via a bearing element, which is provided on the guide vane and is accommodated at least partially in the bushing and at least partially in the passage opening of the at least one casing element, on the bushing.

21. The guide mechanism according to claim 15, wherein at least one sealing element, is retained on the second duct segment on a side of the second duct segment that faces inward in the radial direction.

22. The guide mechanism according to claim 21, wherein the sealing element is retained on the second duct segment via a spoke centering.

23. The guide mechanism according to claim 15, wherein the at least one casing element, the guide vane, and the duct segments are designed as components that are separately constructed and are connected at least indirectly to one another.

24. The guide mechanism according to claim 15, wherein the guide means is configured and arranged for use in a gas turbine.

25. A guide mechanism for a gas turbine, comprising:
at least one casing element, the casing element having a passage opening therethrough;
at least one first duct segment arranged in the radial direction on the inside of the casing element, the first duct segment defining a portion of at least one duct through which gas can flow, at least partially delimited outward in the radial direction; the at least one first duct segment is mounted relative to the at least one casing element via at least two tabs and at least two grooves, which are spaced apart in the axial direction;
at least one second duct segment arranged in the radial direction on the inside of the first duct segment, the second duct segment defining a portion of the duct, at least partially delimited inward in the radial direction;
at least one guide vane arranged at least partially in the duct, the guide vane configured and arranged to rotate around an axis of rotation relative to the at least one casing element and relative to the duct segments; and at least one bushing inserted in the radial direction from the outside to the inside into the passage opening of the casing element, the bushing projecting radially inward from the casing element; the bushing has a wall thickness that is greater than the length of at least one of the tabs of the first duct segment projecting into one of the grooves such that removal of the bushing allows sufficient mobility to move the tabs from an uninstalled state to an installed state within the grooves;

wherein the guide vane is mounted on the casing element via the bushing;

wherein the second duct segment is fastened to the guide vane and is retained on the at least one casing element via the guide vane.

\* \* \* \* \*